(12) United States Patent
Antal et al.

(10) Patent No.: US 6,455,661 B1
(45) Date of Patent: Sep. 24, 2002

(54) PAPERMAKING ADDITIVES AND MECHANICAL PULP WITH PRIMARY AMINO GROUPS

(75) Inventors: Miroslav Antal; Makhlouf Laleg; Ivan Ignac Pikulik, all of Pointe Claire (CA)

(73) Assignee: Pulp and Paper Research Institute of Canada, Pointe Claire (CA)

( * ) Notice: Subject to any disclaimer, the term of this patent is extended or adjusted under 35 U.S.C. 154(b) by 0 days.

(21) Appl. No.: 09/896,732

(22) Filed: Jul. 2, 2001

Related U.S. Application Data

(63) Continuation of application No. PCT/CA00/00006, filed on Jan. 4, 2000.
(60) Provisional application No. 60/114,871, filed on Jan. 6, 1999.
(51) Int. Cl.$^7$ .................................................. C08G 5/04
(52) U.S. Cl. ........................ 527/300; 527/312; 527/600; 524/800; 525/54.21; 162/146; 162/176; 162/177
(58) Field of Search .................................. 527/300, 312, 527/600; 524/800; 525/54.21; 162/146, 176, 177

(56) References Cited

U.S. PATENT DOCUMENTS

| 1,930,472 A | 10/1933 | Dreyfus |
| 3,666,751 A | 5/1972 | Jarowenko et al. |

FOREIGN PATENT DOCUMENTS

| AU | 404812 | 8/1970 |
| CZ | 252999 | 11/1988 |

OTHER PUBLICATIONS

English Translation of CZ 252,999.
"Bulletin of the Institute of Paper chemistry, US, Institute of Paper Chemistry, Appleton", XP 000120869, see the whole Abstract.

*Primary Examiner*—Samuel A. Acquah
(74) *Attorney, Agent, or Firm*—Ogilvy Renault

(57) ABSTRACT

A graft polymer comprises a carbohydrate polymer having pendant 3-amino-2-hydroxy propyl groups grafted thereon and may be employed as a retention aid and strengthening additive in paper manufacture. When the carbohydrate polymer is a component of wood pulp the resulting chemically modified wood pulp may be employed in conjunction with unmodified wood pulp to incorporate therein the retention and strengthening characteristics.

24 Claims, No Drawings

PAPERMAKING ADDITIVES AND MECHANICAL PULP WITH PRIMARY AMINO GROUPS

CROSS REFERENCE TO RELATED APPLICATION

This Application is a Continuation of PCT/CA00/00006 filed Jan. 4, 2000, in which the United States of America was designated and elected, and which remains pending in the International Phase until Jul. 6, 2001, which Application in turn claims priority from U.S. Provisional Application Ser. No. 60/114,871 filed Jan. 6, 1999.

This Application claims priority under 35 U.S.C. 119(e) from U.S. Provisional Application Ser. No. 60/114,871 filed Jan. 6, 1999.

FIELD OF THE INVENTION

The invention relates to a method for the production of a novel type of retention aid and strength additive employed in the manufacture of pulp and paper. The additive is particularly useful in the production of paper blends containing at least a portion of mechanical pulp.

BACKGROUND ART

During the fabrication of paper sheet, a flat jet of a dilute fibrous suspension is injected onto the surface of a specially designed textile, called a forming fabric, or into a converging gap formed by two forming fabrics. The function of the forming fabric is to enable a rapid drainage of water and retain as much of the fibres in the suspension as possible. The bulk of the water is rapidly drained through the fabrics, and a large portion of the suspended solids, such as fibres, fines and filler, is retained on or between the fabrics. Ideally, all the solid material dispersed between the fabrics would be retained in the paper sheet however, a portion, especially very small particles and colloidal material, escapes through the interstices of the forming fabrics. Retention is always less than ideal and, for light grades of paper and tissue, it usually varies between about 30% and 80%. When the retention is poor, a large amount of material must be recirculated to form a sheet with the desired basis weight. Only a fraction of a second is usually available for water drainage on rapidly-operating, modern paper machines. Therefore, for good machine operation, it is critical that drainage occurs rapidly. However, during rapid drainage a high shear stress occurs in the forming zone which tends to separate the particles of fillers and fines from the fibres, thus impairing their retention.

The primary component of mechanical pulps is cellulosic fibres, but the pulps also contain about 30% of small wood debris usually referred to as fines. Furthermore, mineral pigments of small particle size are often used as fillers in amounts ranging from a few % to over 40% of sheet mass. These fillers are added to improve the printing quality of the paper and to reduce its cost. The fines and fillers are too small to be retained on the forming fabrics by filtration. In the absence of chemical additives, a large proportion of these materials passes through the forming fabric and recirculates in the white water loop. Poor retention causes a loss of valuable papermaking material, impairs product quality and increases the cost of both production and waste water treatment.

In common papermaking practice polymeric retention aids are added to a fibrous suspension to improve the retention of fines and fillers. The retention aids are adsorbed on to the surface of the fines and fillers causing coagulation of fine particles into larger conglomerates which are adsorbed on the surface of the pulp fibres. Such polymeric additives, either singly or in complex systems consisting of one or two components and a mineral powder, or as a polymer plus a small molecular weight co-factor, are described in the literature and are sold commercially.

As with most natural fibres, pulp fibres are negatively charged. Most retention aids are therefore positively charged polymers which are adsorbed on to the negatively charged fibres via electrostatic interactions. This mechanism of retention can be efficient for chemical pulps, which are composed of relatively pure cellulose, as most of the lignin and hemicellulose originally present in the wood is eliminated during pulping and bleaching. By contrast, mechanical pulps contain almost all of the original wood mass, including almost all the hemicellulose and lignin. Compared with cellulose, these non-cellulosic wood components usually carry a much greater negative charge. Because of the very large specific surface of mechanical pulp a large amount of negative charge is thus present for electrostatic interaction with dissolved cationic polymers. Negative charges also reside on the dissolved and colloidally dispersed wood components which are present in the mechanical pulp suspensions. Thus, the efficiency of the common retention aid is greatly diminished.

The cationic charge of many papermaking polymers is due either to the presence of quaternary amino groups, which remain cationic at all values of solution pH, or as tertiary amino groups which are cationic only in acidic solution. Polyethelenimine is one polymer, which contains a certain proportion of its amino groups in their primary form.

Recently, chitosan was reported to be an efficient retention additive and strengthening agent for mechanical pulps, [M. Laleg and I. I. Pikulik, Nordic Pulp and Paper Res. J., Vol.7, No. 4 page 174 (1992)]. Chitosan is a natural polysaccharide with a structure similar to cellulose but different from cellulose in that every glucose unit of chitosan contains one primary amino group. In acid solution these amino groups become positively charged, making chitosan, in solution, strongly cationic. Chitosan can thus be used in papermaking as a cationic, polymeric retention aid. Chitosan in its papermaking form, is produced from the shells of sea crustaceans. The procedure for the preparation of chitosan from this source is complex, requiring a large amount of chemicals, and yielding only about 20% based on weight of dry shells. Chitosan is, therefore, relatively expensive. Since the world supply of sea shells suitable for industrial production is limited, chitosan from this source cannot be relied upon to satisfy a large scale demand from the paper industry. Thus, a new class of retention additives having the properties of chitosan, but which could be produced in large quantities at low cost, would be highly desirable.

Dry-strength additives are often used to increase the strength of dry paper and board; cationic starches and water-soluble synthetic polymers such as polyacrylamides are examples. In contrast, wet-end additives increase the strength of paper which was previously dried and then rewetted. Urea-formaldehyde resins and similar materials can be used for this purpose. These additives are capable of cross linking the cellulosic network by covalent bonds, but cross linking only occurs at the elevated temperature and low moisture content encountered in the dryer section of a paper machine, and "curing" often continues for weeks after the paper has been fully dried. The wet strength caused by these additives is usually permanent and it can be difficult to disintegrate such paper or board during recycling. Wet-strength additives are well known, and have been extensively described in the literature.

Wet-web strength additives are capable of increasing the strength of a freshly-formed, never-dried wet web as it proceeds on the paper machine towards the dryer section of a papermachine. These additives are new in the industry and are not widely used. Only three wet-web strength additives have been described in the literature: chitosan, polyethelenimine and cationic aldehyde starch.

Several published reports describe the preparation of cellulose derivatives that contain primary amino groups. In each case, the product is a solid material which is insoluble in water and which is, therefore, not suitable for application as a papermaking additive. Most of these reports are academic describing preparation procedures that are completely unsuitable for industrial application.

Several investigators have reacted starch with epichlorohydrin. H. Dreyfus [German patent 550,760 (1929)] and M. Hartman [U.S. Pat. No. 1,777,970 (1930)] describe the production of starch substituted by tertiary amino groups, and which is insoluble in water. Syntheses described by C. P. L. Vaughan [U.S. Pat. Nos. 2,591,748 (1952) and 2,623,042 (1952)] yielded starches containing tertiary amines which, at high degree of substitution, were soluble in dilute acids. The preparation of tertiary amines was also described by P. Schlack in U.S. Pat. No. 2,131,120 (1938), while C. L. Hoffpauir and J. D. Guthrie [Textile Res. J., Vol. 20, page 617 (1950)] and E. F. Evans [U.S. Pat. No. 2,768,162 (1956)] describe the preparation of quaternary amines. In studies conducted by Dreyfus and Schlack, cited above, carbohydrates were reacted with epichlorohydrin in alkaline conditions, and these conditions lead inevitably to crosslinking and the formation of insoluble products.

T. Nischiuchi et al. in [Nippon Kagaku Kaishi. 1997 (11) p. 1711–16] describe the reaction of starch with epichlorohydrin in dilute sulphuric acid, and the reaction of the resulting chlorine derivative with triethylamine. The product contained only quaternary ammonium groups. U.S. Pat. No. 4,060,683 describes the reaction of starch with 2,3-dibromopropionamide and secondary amines under alkaline conditions. The product did not contain primary amino groups.

Starches with substituted primary amino groups have been prepared using complicated procedures, which, if applied on a commercial scale, would make the products too expensive and unsuitable for application as papermaking additives. Examples of such synthetic routes are described by F. Pancirolli and A. A. Houghton [UK patent 493,513 (1938)].

All the above described procedures consisting of reacting starch with epichlorohydrin followed by treating the reaction product with amines, were carried out under conditions which lead to the formation of water-insoluble tertiary and quaternary amines. Available procedures for the preparation of starches or other water-soluble carbohydrate polymers having primary amino groups are too complex and expensive to be used commercially. A simpler, far less expensive procedure is desirable if such preparations are to be used commercially as papermaking additives.

SUMMARY OF THE INVENTION

This invention seeks to provide graft polymers useful as retention aids and strength additives in pulp and paper manufacture; as well as intermediate graft polymers.

The invention also seeks to provide chemically modified pulp fibres having the ability to form cross-links by covalent chemical bonding; as well as intermediate chemically modified pulp fibres.

Still further, the invention seeks to provide a process for producing graft polymers and chemically modified pulp fibres.

Still further the invention seeks to provide a retention aid and strength additive.

The invention also seeks to provide wood pulps and paper sheets formed therefrom.

In accordance with one aspect of the invention there is provided a graft polymer comprising a carbohydrate polymer having pendant 3-X-2-hydroxy propyl groups grafted thereon, wherein X is selected from amino and a leaving group.

In accordance with another aspect of the invention there is provided a process for producing a graft polymer comprising a carbohydrate polymer of formula (I):

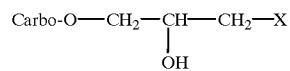

wherein X is amino or a leaving group, and carbo represents a carbohydrate polymer, comprising: i) reacting a carbohydrate polymer with a compound of formula (II):

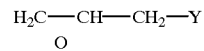

wherein Y is a leaving group to produce a graft polymer represented by (III):

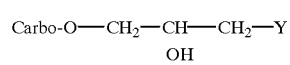

wherein Y is as defined above and carbo represents the carbohydrate polymer, and, when a polymer is desired in which X is amino; ii) converting the 3-Y of the polymer (III) to 3-amino.

In accordance with still another aspect of the invention there is provided a chemically modified wood pulp comprising pulp fibres having pendant 3-X-2-hydroxy propyl groups, grafted on polysaccharides in said pulp fibres, wherein X is selected from amino and a leaving group.

In accordance with yet another aspect of the invention there is provided a retention aid and strength additive comprising a carbohydrate polymer having pendant 3-amino-2-hydroxy propyl groups grafted thereon, in an aqueous vehicle.

In accordance with still another aspect of the invention there is provided a wood pulp comprising pulp fibres and a graft polymer of the invention.

DESCRIPTION OF THE PREFERRED EMBODIMENTS OF THE INVENTION

The graft polymers of the invention wherein X is amino and the carbohydrate is a free polysaccharide form retention aids and strengthening additives for use in pulp and paper manufacture.

The corresponding graft polymers in which X is a leaving group are intermediates for producing the desired graft polymers.

Suitable leaving groups include chlorine, bromine, iodine, tosyl, mesyl and brosyl, with chlorine being especially preferred.

The carbohydrate is more especially, a natural polysaccharide.

In this embodiment there is thus provided a new class of polymeric papermaking additives that can be used in paper manufacture as a retention aid and a strength improvement agent. The additives are derived from natural starches and their components, such as amylose and amylopectine or from natural cellulose and its derivatives, or from other carbohydrates. Naturally occurring carbohydrate polymers are converted into papermaking additives by chemically inserting into their molecular structure substituents containing primary amino groups. These primary amino groups will react to form chemical bonds, with carbonyl groups which are especially abundant in wood fibres and fines. The papermaking additives are particularly suitable in the production of paper from fibrous pulp suspensions containing at least some mechanical fibre.

The carbohydrate may also be natural polysaccharide in wood pulp fibres, and especially cellulose, hemicellulose or lignocellulose. In this case the wood pulp fibres may be chemically modified by grafting the pendant groups of the invention onto the natural polysaccharide in the wood pulp fibres. In this case when X is a leaving group the chemically modified pulp is an intermediate for the chemically modified pulp in which X is amino. The amino groups provide a cross-linking ability in the fibres.

In this embodiment the wood pulp fibres are most suitably mechanical pulp fibres.

Retention Aid and Strengthening Additive

The invention provides a family of novel, inexpensive, water-soluble carbohydrate graft polymers. The graft polymers are suitably prepared by modifying inexpensive and abundant natural polysaccharides such as corn, wheat or potato starch, or hemicellulose separated from wood or agricultural wastes, and grafting them with substituents containing primary amino groups.

The reaction sequence is described hereinafter by reference to the preferred embodiment in which Y in formula (II) is chlorine, such that the compound of formula (II) is epichlorohydrin.

The reaction sequence consists of two steps. In the first step, a polysaccharide is reacted with epichlorohydrin to yield a 3-chloro-2-hydroxypropyl polysaccharide, as shown below in reaction scheme (A):

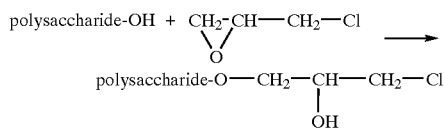

(A)

In the second step, the chlorine atoms of the 3-chloro-2-hydroxypropyl polysaccharide molecules are substituted with primary amino groups by a reaction with ammonia or ammonium hydroxide, as shown in the following reaction scheme (B):

(B)

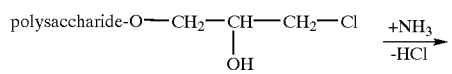

-continued
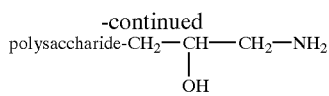

In scheme (A) polysaccharide-OH represents a natural polysaccharide.

The water-soluble primary amino group substituted polysaccharide thus prepared can then be employed as an additive added to a pulp suspension, in the form of a water solution.

It has now been discovered that the primary amino groups are highly capable of forming imino bonds with the carbonyl groups present in mechanical pulps. It has also now been discovered that crosslinking in this manner results in the improved retention of fines and filler in the pulp during pulp processing such as paper manufacture.

Since this reaction proceeds readily even in aqueous conditions, the addition of these additives in a pulp slurry can improve the strength of both never-dried wet webs and rewetted paper. As carbonyl groups are particularly abundant in mechanical pulps, these novel papermaking additives are especially suitable for the production of paper containing mechanical pulp. The cationic ammonium groups can also form electrostatic interactions with anionic groups present in the pulp which are capable of forming hydrogen bonds with carbonyl and hydroxyl groups.

In the first step the reaction may be carried out in an aqueous medium or in an organic solvent such as dioxane. The use of an aqueous medium is preferred. The first step is catalyzed by inorganic or organic acids. The acid catalyst may be a weak organic acid such as acetic acid or formic acid, or an inorganic acid such as boric acid. The acid catalyst may also be a strong acid such as perchloric acid or sulphuric acid.

Weak organic acids are preferred as the catalyst since strong acids have a greater tendency to hydrolyze the carbohydrate. Employing a weak organic acid minimizes hydrolysis of the carbohydrate polymer.

Under alkaline conditions, epichlorohydrin will cross-link with carbohydrates and form undesirable, insoluble products thus, an acid pH range of 2.5–5.0 is preferred.

The reaction can also be performed without the isolation of the 3-chloro-2-hydroxypropyl polysaccharide, by adding ammonium hydroxide or ammonia directly into the product of the first reaction step. The addition of ammonium hydroxide or ammonia changes the pH of the solution from acidic to alkaline values. Under this condition, unreacted epichlorohydrin is converted to harmless oligomers. The product, 3-amino-2-hydroxypropyl carbohydrate polymer, can be isolated, dried and stored in a powder form. Alternatively, the reaction mixture can be used as a papermaking additive without any further treatment.

Epichlorohydrin is a bifunctional reagent with two reactive sites: the oxirane ring and the chlorine atom. In acidic medium, however, it can only react at the oxirane ring to form etheric bonds with the hydroxyl groups of the polysaccharides. The -halohydrin of epichlorohydrin formed in this reaction is stable in acidic medium. The reaction of chlorine with ammonium hydroxide or ammonia introduces only primary amino groups into the structure of the polysaccharide. No secondary, tertiary and quaternary amino groups are created under these reaction conditions as no epichlorohydrin is left in the reaction mixture by the time of the ammonium hydroxide or ammonia addition.

A single molecule of the novel graft polymer prepared in the above manner can react with carbonyls on more than just one fiber. Thus, strong covalent bonds formed in this manner can bridge the fibrous network and also bind fillers to fibres. Since carbonyl groups are abundant in the lignin and hemicellulose portion of wood, but are relatively rare in cellulose, the polymer is a better retention aid and strength agent for mechanical pulps than for chemical pulps.

The novel graft polymers also resemble other water-soluble cationic polymers in that they can form electrostatic interactions with the anionic groups of chemical or mechanical pulp. Their primary amino groups can also form hydrogen bonds with the hydroxyl and carbonyl groups residing on pulp.

Chemically Modified Pulp

Chemically modifying mechanical pulp fibres to provide fibres and fines having the ability to crosslink fibres in a wet cellulosic web by covalent chemical bonding is accomplished directly by grafting the pulp fibres with substituents containing primary amino groups.

The reaction sequence is described hereinafter by reference to the preferred embodiment in which Y in formula (II) is chlorine, such that the compound of formula (II) is epichlorohydrin.

The reaction is carried out in two steps. In the first step, the lignin and hemicellulose containing pulp is reacted with epichlorohydrin in an acidic aqueous suspension to graft a 3-chloro-2-hydroxypropyl pendant group onto the polysaccharide macromolecules of pulp fibres. The reaction scheme is outlined in reaction scheme (C) below:

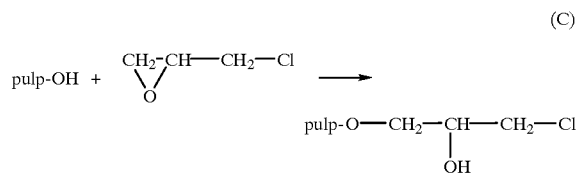

(C)

In the second step, the chlorine atoms in the 3-chloro-2-hydroxypropyl-substituted pulp are substituted with primary amino groups by reacting the pulp with ammonia or a dilute solution of ammonium hydroxide, as shown in the following reaction scheme (D):

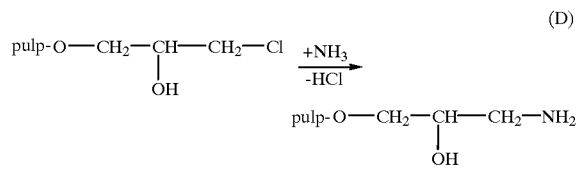

(D)

In scheme (C) pulp-OH represents a wood pulp.

The first reaction is catalysed by strong mineral acids such as sulphuric acid, but preferably, at low concentrations in order to minimize the hydrolysis of cellulose.

The amount of chlorohydroxypropyl pendant groups present in the final product depends on the amount of epichlorohydrin used, the reaction time and the reaction temperature.

The amount of epichlorohydrin suitably ranges from 20 g to 200 g per kg of dry pulp. The reaction rate increases with temperature; at 90° C. the reaction is completed in 30 minutes. An adequate reaction time depends on the temperature and suitably ranges from 15 minutes to 5.0 hours. A reaction time of 0.5 to 3.0 hours at temperatures between 70 and 100° C., is particularly convenient as, under these conditions, the harmful epichlorohydrin reacts to completion and is no longer present in the reaction mixture. The reaction can be carried out in an aqueous suspension, at a consistency ranging from a fraction of one percent to as high as is practical, considering that a homogeneous dispersion of epichlorohydrin and ammonia in the pulp is required. The consistency of the reaction mixture is only limited by the ability to thoroughly mix the reagent into the water-pulp mixture.

After the reaction with epichlorohydrin the pulp can be washed to remove any impurities and by-products, however, washing of mechanical pulp is difficult as it requires expensive machinery and the pulp mats that are formed usually have a low water drainage. The residual reagent can also be removed using a two-roll press, or a screw press. Alternatively, the reaction mixture can be used directly "as is" in the second reaction step.

This second reaction step can be carried out without the isolation of the 3-chloro-2-hydroxypropyl-pulp by adding the ammonia or ammonium hydroxide directly into the product of the first reaction step. The addition of ammonia or ammonium hydroxide changes the pH of the solution from acidic to alkaline. Any residual, unreacted epichlorohydrin is converted into harmless oligomers under this condition.

As most mechanical pulps undergo yellowing if exposed to alkaline condition, it is important that the pH of the reaction mixture remains as low as possible and that the reaction time be kept short. To minimize pulp brightness loss, the pH of the reaction mixture should suitably be kept below 9.0 preferably, below 8.5.

The amount of 25% ammonium hydroxide used can range from 1 g to 15 g per gram of epichlorohydrin used in the first reaction step. The reaction mixture should be well agitated to assure a uniform distribution of the ammonium hydroxide. The reaction time can suitably range from 0.3 h to 14 h at temperatures ranging from 20° C. to 100° C. The consistency of the reaction mixture can be similar to that in the first reaction step although better results are obtained at lower consistency, down to 10% or even 5%. The temperature and pH requirements are less demanding if the reaction is carried out in the presence of common brightening agents that prevent pulp discolouration, such as sodium hydrosulfite or hydrogen peroxide.

After the second reaction step the liquid in the reaction mixture is yellow and should be removed to avoid completing discolouration of the final product. We have found, however, that the addition of about 5% of chemically modified pulp to unsubstituted pulp does not significantly decrease paper brightness. Thus, if the addition rate of the modified pulp is low, it is possible to use an easy and inexpensive procedure in which both reaction steps are carried out in the same reaction vessel without isolation of either the intermediate or the final product. If a high product brightness is required or, if no chemical bleaching or brightening agents are used, washing or press-dewatering of pulp is required to remove the coloured components, particularly if the proportion of modified pulp is greater than 5%.

The primary amino groups present in the modified pulp are capable of forming imino bonds with the carbonyl groups found in mechanical pulp, as is shown below. This cross-linking results in an improved retention of fines and filler. Since this reaction proceeds readily even in aqueous conditions, the chemical modification of mechanical pulps according to this invention can improve the strength of never-dried wet webs and rewetted paper.

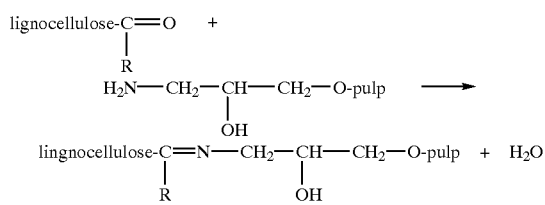

(E)

wherein R is hydrogen or a natural substituent of the lignocellulose.

This chemical modification is particularly beneficial for mechanical pulps since carbonyl groups in the form of aldehydes or ketones are particularly abundant in such pulps. In addition, the amino groups become positively charged under acidic conditions resulting in the interaction of these positively charged groups with the naturally occurring negatively charged groups in both mechanical and chemical pulps, leading to improved retention and strength properties of dry paper.

The chemical modification of pulp according to this aspect of the invention leads to the introduction of primary amino groups into the pulp structure and results in improved retention of fibres, fines and fillers during paper sheet forming and to a greater strength of wet paper. This type of pulp modification can reduce or completely eliminate any further need for retention aids and strength improving additives. The modification of mechanical pulp according to this invention is so effective in improving the retention and the strength properties of wet paper that, for many applications, it might be sufficient to add only a minor proportion of chemically modified pulp to the bulk of unmodified pulp in order to obtain the desired paper properties required. The application of pulp, modified according to this invention, can lead to the elimination or to a substantially reduced consumption of polymer additives. More extensively modified pulps can be used for the production of water-resistant board used, for example, in construction or for packaging.

EXAMPLES

The production and application of the novel papermaking additives disclosed above are demonstrated in the following examples.

Example 1

10 g of amylopectine was suspended in a mixture of 10 mL of acetic acid and 10 mL of water for 30 min. Epichlorohydrin (20 mL) was added, and the mixture was stirred for 4 hours at 80–90° C. After cooling, the product was first washed with water until there was a negative reaction to chloride ions and then washed with acetone. The yield of the resulting, dry, 3-chloro-2-hydroxypropylamylopectine product was 10.55 g.

1 g of 3-chloro-2-hydroxypropylamylopectine was suspended in 50 mL of water and cooked at 85–90° C. The reaction mixture was cooled and 1.4 g of a 50% solution of NaOH and 20 ml of 25% $NH_4OH$ was added and the mixture was stirred for 8 hours at 20° C. Unreacted $NH_4OH$ was then removed by either heating the reaction mixture or evaporating it under vacuum. The product was precipitated by pouring the aqueous solution into an excess of ethyl alcohol or acetone, and washed with ethyl alcohol or acetone until it gave a neutral reaction when tested with phenolphthalein indicator. Finally, the product was dried to yield 0.95 g of dry 3-amino-2-hydroxypropyl-amylopectine.

The addition of 1% of this 3-amino-2-hydroxypropylamylopectine to a mixture of 80% TMP and 20% clay increased fibre retention from 50% to 80% and filler retention from 3.5% to 62%.

Example 2

A mixture of 10 g alkali-soluble hydroxyethyl cellulose, 20 mL of epichlorohydrin and 5 mL of acetic acid was stirred for 4 hours at 80–90° C. The solid reaction product was filtered and washed with acetone until the filtrate gave a negative reaction when tested for chloride ions. This reaction yielded 9.88 g of 3-chloro-2-hydroxypropyl-hydroxyethyl cellulose.

One gram of 3-chloro-2-hydroxypropyl-hydroxyethyl cellulose was dissolved in 20 mL of 25% $NH_4OH$ and stirred for 4 hours at 20° C. and 4 hours at 70° C. After a vacuum evaporation of $NH_4OH$, the product was precipitated by pouring the solution into an excess of acetone and filtered-out. The filtrate was washed with acetone until it gave a neutral reaction when tested with phenolphthalein indicator. The product was 3-amino-2-hydroxypropyl-hydroxyethyl cellulose.

The addition of 0.5% of 3-amino-2-hydroxypropyl-hydroxyethyl cellulose to unmodified TMP was found to increase the breaking length of dry handsheets, made therefrom, by 12.5%; the tensile energy absorption by 13% and, the z-direction strength by 17%.

Example 3

With a mild agitation, 10 g of amylopectine was dispersed in 20 mL of epichlorohydrin to which a solution of 5 mL of acetic acid and 5 mL of water was added. The mixture was stirred for 4 hours at 90° C. and 500 mL of water and 100 mL of 25% $NH_4OH$ were added and stirred again for an additional 8 hours at 70° C. Unreacted ammonium hydroxide was evaporated under vacuum and the product was dissolved in water and diluted to a 1% solids content. The addition of 1% of the diluted product to a blend of 80% TMP and 20% clay increased fibre retention from 53.5% to 60.5% and filler retention from 2.5% to 22.5%.

The introduction of primary amino groups into a pulp structure in accordance with the invention is demonstrated as follows:

Example 4

Under continuous agitation 10 g of thermo-mechanical pulp (TMP) suspension, having a solids content of 30%, was added to a mixture of 200 mL, of dioxane and 10 mL water. After stirring for 30 mins 18 mL of epichlorohydrin was added, followed by an addition of a solution of 200 mL of dioxane and 5 mL of 80% $H_2SO_4$. The reaction suspension was stirred for 24 hours at 20° C. The pulp, modified in this manner, containing the 3-chloro-2-hydroxypropyl substituents was then filtered and washed with water. This intermediate product was dispersed into 220 mL of 25% ammonium hydroxide, the suspension was agitated at 20° C. for 6 hours, and the excess of $NH_4OH$ was evaporated in vacuum. The product was thermomechanical pulp substituted with 3-amino-2-hydroxypropyl groups.

The addition of 5% of the 3-amino-2-hydroxypropyl substituted thermomechanical pulp to an unmodified TMP resulted in a 15% increase in breaking length, a 20% increase in the tensile energy absorption index, an 18% increase in the z-direction strength and a 5% increase in the wet breaking length at a solids content of 40%.

Example 5

10 g of TMP suspension having a 30% consistency was added to 20 mL of epichlorohydrin and 5 mL of acetic acid and the mixture was agitated for 4 hours at 80–90° C. Then 20 mL of water was added and the pulp was washed with water until the filtrate gave a negative reaction to Cl⁻ when tested with silver nitrate solution. Ten grams of the resultant, undried, 3-chloro-2-hydroxypropyl thermomechanical pulp, having a solids content of 30%, was added to 220 mL of a 25% solution of ammonium hydroxide. The suspension was stirred for 4 hours at 20° C. and 2 hours at 70° C. After cooling, the pulp was filtered and washed with water until the filtrate gives a neutral reaction when tested with phenolphthalein indicator. The filtered 3-amino-2-hydroxypropyl thermomechanical pulp had a solids content of 40%.

For testing purpose a mixture of 5% of TMP modified in this manner was blended with unmodified TMP to prepare handsheets. The optical properties of the handsheets remained the same as sheets made from unmodified pulp. The addition of the modified pulp resulted in an increase of the dry breaking length of the unmodified TMP by 10%, the tensile energy absorption index by 14%, the z-direction strength by 17% and the breaking length of wet paper (at a solids content of 50%) by 5%.

Example 6

250 g of a 20% aqueous TMP suspension was mixed with 250 mL of 0.1% sulfuric acid and 2.5 g of epichlorohydrin and stirred for 2 h at 90° C. The reaction mixture was cooled to 70° C. and 5 g of 25% ammonium hydroxide was added. The modified pulp was agitated for 1 hour and then used without washing.

A blend of 2% modified pulp and 98% unmodified TMP was used to prepare handsheets for testing purposes. Although the modified pulp by itself was visibly discoloured, the optical properties of handsheets made from the pulp blend were similar to those of handsheets made with the unmodified TMP. The small addition of the modified pulp resulted in increasing the dry breaking length of the unmodified TMP by 15%; the tensile energy absorption by 13%, the elastic modulus by 4%, the z-direction strength by 15% and the wet breaking length (at a solids content of 45%) increased by 9%.

Example 7

250 g of wet TMP having a solids content of 20% was mixed with 500 g of 0.05% sulfuric acid, 2.5 g of epichlorohydrin was added, and the mixture was stirred for 1 hour at about 90° C. After cooling to about 70° C, 5 g of 25% ammonium hydroxide was added, and the mixture was agitated for 1 hour. The modified pulp was then used for papermaking without washing or any further treatment.

A blend of 5% of the modified pulp and 95% unmodified TMP was used to prepare handsheets for testing purposes. The properties of these handsheets were compared with handsheets made from the unmodified TMP. The addition of 5% of the modified pulp resulted in increasing the dry breaking length of the unmodified TMP by 10%; the tensile energy absorption by 4.5%, the elastic modulus by 12%, the Scott bond by 12% and the tensile strength of the rewetted paper (at 45% solids content) by 5%. The brightness was reduced by 0.8%.

Example 8

1000 kg of tap water was heated to a temperature of 70–80° C. Under continuous agitation 100 kg of thermomechanical pulp, at a consistency of 50%, was added and treated for 4 hours. After homogenization, 2.5 kg of sulfuric acid (10% water solution) was added to the pulp. The pH of the mixture decreased to 2.6. Subsequently, 2.5 kg of epichlorohydrin was added and the mixture was agitated for 4 hours at 70° C. To convert the chlorine to primary amino groups in the reaction, 6.5 kg of ammonium hydroxide (30% water solution) was added at 70° C. for 1 hour in a like reaction vessel to form a modified pulp.

A slurry blend of 5% of the modified TMP fibres (containing 3-amino-2-hydroxypropyl substituents) and 95% unmodified TMP fibres was processed on a pilot paper machine to produce a dry paper product having a 16% increase in breaking length and tensile index and, 16.5% increase in elastic modulus.

While the brightness was slightly reduced, the fibre retention value increased from 75.5% to 79.0%, the white water consistency decreased from 19.5% to 16%; the wet web tensile index increased by 3.5% at a consistency of 41% and, the breaking length of the rewetted web increased by 16%.

We claim:

1. A retention aid and strength additive for use in pulp and paper manufacturing consisting essentially of a graft polymer of formula (I):

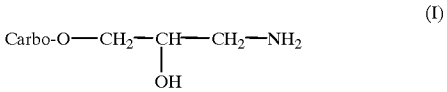

wherein Carbo represents a carbohydrate polymer, in an aqueous vehicle.

2. A retention aid and strength additive according to claim 1, wherein said carbohydrate polymer is a natural polysaccharide.

3. A retention aid and strength additive according to claim 1, wherein said carbohydrate polymer is a polysaccharide present in wood pulp fibres.

4. A retention aid and strength additive for use in pulp and paper manufacturing comprising a graft polymer of formula (I),

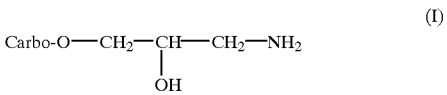

wherein Carbo represents lignocellulose, in an aqueous vehicle.

5. A retention aid and strength additive according to claim 1, wherein said carbohydrate polymer is selected from the group consisting of natural starches, amylose, amylopectin, cellulose, cellulose derivatives, hemicellulose and lignocellulose.

6. A chemically modified wood pulp represented by formula (X):

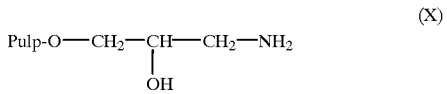

and comprising pulp fibres having pendant 3-amino-2-hydroxy propyl groups, grafted on polysaccharides in the pulp fibres, wherein Pulp-O- represents a grafting site on the pulp fibres.

7. A wood pulp comprising pulp fibres and a chemically modified wood pulp of claim 6.

8. A wood pulp comprising pulp fibres and a graft polymer of formula (I);

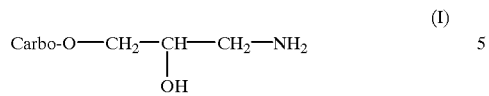
(I)

wherein Carbo represents a carbohydrate polymer, as a retention aid and strength additive, said graft polymer being the sole graft polymer.

9. A paper sheet formed from a wood pulp of claim 8.

10. In a method of manufacturing a paper sheet from a wood pulp in which a retention aid or strength additive is incorporated in the pulp, the improvement wherein the retention aid or strength additive consists essentially of a graft polymer of formula (I):

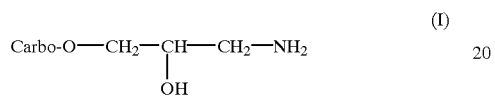
(I)

wherein Carbo represents a carbohydrate polymer.

11. In a method of manufacturing a paper sheet from a wood pulp, the improvement comprising incorporating in said wood pulp a chemically modified wood pulp represented by formula (X):

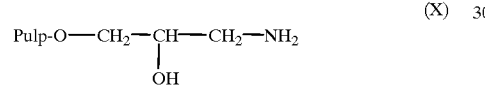
(X)

and comprising pulp fibres having pendant 3-amino-2-hydroxy propyl groups, grafted on polysaccharides in the pulp fibres, wherein Pulp-O- represents a grafting site on the pulp fibres.

12. A method according to claim 11, wherein said wood pulp is a mechanical pulp and carbonyl groups in said mechanical pulp form imino bonds with the amino groups of said chemically modified wood pulp.

13. A process for producing a carbohydrate polymer of formula (I):

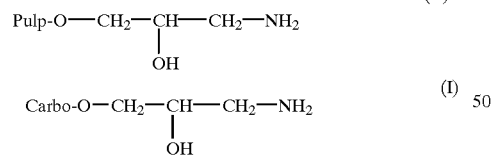
(X)
(I)

wherein Carbo represents a carbohydrate polymer as a sole graft polymer, comprising:

i) reacting a carbohydrate polymer with a compound of formula (II):

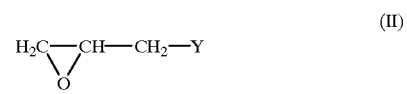
(II)

wherein Y is a leaving group to produce a graft polymer represented by (III):

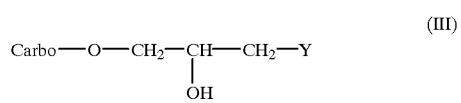
(III)

wherein Y is as defined above and Carbo represents the carbohydrate polymer, in an aqueous medium in the presence of an acid as catalyst, at a pH of 2.5–5.0, at a weight ratio of 20 to 200 g of said compound of formula II per kg of said carbohydrate polymer and ii) converting the 3-Y of the polymer (III) to 3-$NH_2$ at an alkaline pH.

14. A process according to claim 13, wherein Y is selected from chloro, bromo, iodo, tosyl, mesyl and brosyl.

15. A process according to claim 13, wherein step ii) comprises reacting said graft polymer (III) with ammonia or ammonium hydroxide.

16. A process according to claim 15, wherein Y is chloro and said compound (II) is epichlorohydrin.

17. A process according to claim 13, wherein said acid is a weak organic or inorganic acid.

18. A process according to claim 13, wherein said acid is a strong mineral acid.

19. A process according to claim 13, wherein the graft polymer (III) is isolated prior to step ii).

20. A process according to claim 13, wherein step ii) is carried out directly on the reaction product resulting from step i), without isolation of said graft polymer (III).

21. A process according to claim 13, wherein step i) is carried out at a temperature of 70 to 100° C. in a reaction time of 0.5 to 3 hours.

22. A process according to claim 13, wherein said carbohydrate polymer is a natural polysaccharide.

23. A process according to claim 13, wherein said carbohydrate polymer is a polysaccharide present in pulp fibres.

24. A process according to claim 13, wherein said carbohydrate polymer is lignocellulose present in pulp fibres.

* * * * *